Oct. 28, 1952 G. J. BACSIK 2,615,792
APPARATUS FOR SEPARATING TWO-PHASE MIXTURES
Filed Aug. 13, 1948

George J. Bacsik Inventor
By W. O. T. Heilman Attorney

Patented Oct. 28, 1952

2,615,792

UNITED STATES PATENT OFFICE 2,615,792

APPARATUS FOR SEPARATING TWO-PHASE MIXTURES

George J. Bacsik, Bayonne, N. J., assignor to Standard Oil Development Company, a corporation of Delaware Application August 13, 1948, Serial No. 43,998

1 Claim. (Cl. 23—270.5)

The present invention relates to a method and apparatus for separating two phase mixtures of substantially immiscible liquids and particularly for the separation of such mixtures produced in a liquid-liquid extraction process such as in the extraction of hydrocarbon oils with phenol.

It is an object of the invention to improve the separation of phases in a mixture in order to reduce the magnitude of entrainment of one phase in the other thereby increasing the efficiency of the extraction process.

Figure 2:
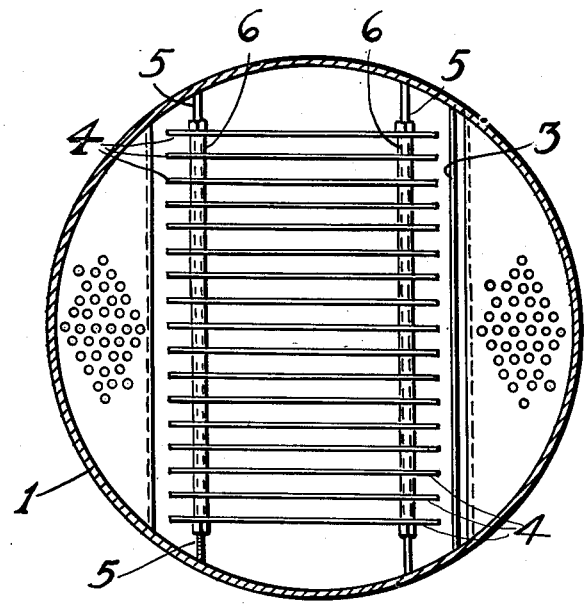
Figure 1:
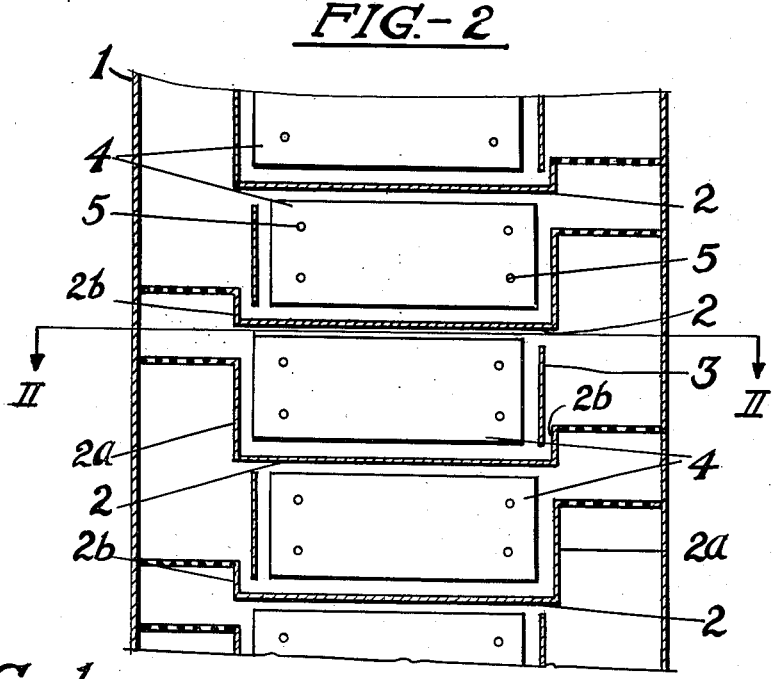

The invention and its objects may be more fully understood from the following specification when read in conjunction with the accompanying drawings in which:

Figure 1 is a vertical section through an extraction tower, according to one form of the invention, and Figure 2 is a horizontal section through such tower along the line II—II of Figure 1.

In the embodiment illustrated the numeral 1 designates an extraction contacting tower through which two liquids are flowed in countercurrent relation, the lighter liquid, such as a hydrocarbon oil, being introduced at the bottom of the tower and the heavier liquid, such as phenol, being introduced at the top of the tower. Within the tower are disposed a plurality of horizontally disposed step-type plates 2, each plate being provided with raised step portions 2a and 2b disposed in diametrically opposed relation adjacent the tower walls. Of the portions 2a and 2b, one portion, such as 2a, is of greater height than the the other, such as 2b, and within the tower these portions are disposed in opposite vertically contiguous relation so that from plate to plate the portion 2a of one plate will be disposed in substantially closely spaced relation to the portion 2b of the plate above. The upper surface of each elevated portion of the plate, which may be designated as the "tread" of the steps formed, is perforated to permit passage of liquids from plate to plate through the tower.

With the plates disposed in such fashion a mixing zone chamber is formed between each step portion 2a, and the step portion 2b immediately above it, and horizontally between the portions of the plates, intermediate the steps 2a and 2b, a separation zone chamber, while between the portions 2b and portions 2a immediately above them a discharge zone chamber is formed. A vertically disposed baffle member 3 is provided to restrict the flow of liquids from the separation zone into the discharge zone.

The separation zone, between each pair of plates, is provided with a plurality of vertically disposed plate members 4 which extend laterally, substantially from side to side of the zone between the step portions 2a and the baffles 3. These members are suspended within the separation zone as by means of rods 5 and held in spaced relation thereon as by separators 6 on the rods 5 between each plate, or each plate may be individually supported in any other convenient fashion. The plate members 4 are fabricated of a material which will be preferentially wet by one or the other phase of a two phase mixture of the materials flowing through the tower. For example, in the extraction of a hydrocarbon oil with phenol, the plates may be fabricated from a metal having a high nickel content, or may be nickel plated, nickel having been found to be preferentially wet by hydrocarbon oils. Other materials preferentially wetted by one or the other of the materials in a two phase mixture may be used as the plate material, or as a coating for the plates. Silicon polymers may be used as a coating preferentially wetted by aqueous treating materials. Preferably the plates 4 are disposed in vertically spaced relation to the plates 2 above and below the separation zone between to allow for pressure equalization and improve flow distribution and separation of phases.

In operation, lighter liquid such as a hydrocarbon oil will be passed upwardly through the tower and be discharged through the perforations in the "tread" of each step portion 2a, while the heavier liquid such as phenol will be passed downwardly through the tower by way of the perforations in the "treads" 2b entering into an intimate two phase mixture with the hydrocarbon oil in the mixing zone between the respective step portions. This intimate mixture will then flow into the separation zone between step portions of each plate, flowing around plate members 4 as narrow vertical streams defined by the respective members. The separation of the mixture taking place within the several streams of the mixture passing through the separation zone will cause the lighter liquid to rise from the stream into the narrow unrestricted space above the plates and the heavier liquid to pass downwardly into the narrow unrestricted space below the plates from whence each liquid will flow past the baffle member 3 into the discharge zone between the plate portions 2b and 2a, the lighter liquid passing upwardly into the step portion 2a of the plate next above while the heavier liquid will flow downwardly through the perforations of the step portion 2b. By contacting the mixture in the separation zone between each plate with a material which is preferentially wetted by one phase of the mixture, separation of the mixture is accelerated and entrainment of one phase in the other substantially reduced due to an increased tendency of the liquid which preferentially wets the material of the plates 4 to coalesce in contact therewith.

What is claimed is:

An apparatus for contacting two substantially immiscible liquids of dissimilar specific gravity, as a two phase mixture of said liquids, comprising a hollow vertical shell, a plurality of vertically spaced transverse partition members interiorly of said shell, of which each pair of partition members with the shell defines a lateral series of contiguous substantially confluent mixing, separation and discharge zones in succession, said series having common upper and lower wall portions provided by said plate members, and in which series said mixing and discharge zones are disposed in opposed relation diametrically of said vessel, with the mixing zone of any one series coinciding vertically with and disposed intermediate adjacent discharge zones of the series above and below, means for introducing the heavier liquid of said two phase mixture downwardly into each of said mixing zones from a discharge zone immediately above it and the lighter liquid of said two phase mixture upwardly into said mixing zone from a discharge zone immediately below it, a plurality of plate elements preferentially wettable by one of said liquids to be contacted, suspended vertically in each separating zone in closely spaced parallel relation one to another and extending through said separation zone between the opposed mixing and discharge zones in the same series and having upper and lower and end edge portions terminating in spaced relation to the partition members above and below the zones in said series, and to the discharge and mixing zones thereof respectively, said plates defining a plurality of narrow vertical parallel passageways within said separation zone which are confluent at the upper, lower, and end edge portions of said plate members, separate means for introducing said heavier liquid into the shell above the uppermost partition member and for removing said heavier liquid below the lowermost partition member, and separate means for introducing the lighter liquid into the shell below the lowermost partition member and for removing said liquid from above the uppermost partition member.

GEORGE J. BACSIK.

REFERENCES CITED

The following references are of record in the file of this patent:

UNITED STATES PATENTS

| Number | Name | Date |
|---|---|---|
| 1,864,911 | Jodeck | June 28, 1932 |
| 2,037,318 | Fenske et al. | Apr. 14, 1936 |
| 2,077,057 | Poole | Apr. 13, 1937 |
| 2,121,318 | Evans | June 21, 1938 |
| 2,154,144 | Albin | Apr. 11, 1939 |
| 2,205,986 | Mangelsdorf et al. | June 25, 1940 |
| 2,215,359 | Livingston et al. | Sept. 17, 1940 |
| 2,253,326 | Davis | Aug. 19, 1941 |
| 2,271,462 | Pfennig | Jan. 27, 1942 |
| 2,324,952 | Read | July 20, 1943 |
| 2,345,667 | Hachmuth | Apr. 4, 1944 |